(12) United States Patent
Fremrot et al.

(10) Patent No.: US 12,530,549 B2
(45) Date of Patent: Jan. 20, 2026

(54) COMPUTING-DEVICE-IDENTIFICATION-TAG-BASED WIRELESS COMMUNICATION ENABLEMENT/DISABLEMENT SYSTEM

(71) Applicant: Dell Products L.P., Round Rock, TX (US)

(72) Inventors: Per Henrik Fremrot, Novato, CA (US); Colin Montgomery, Mountain View, CA (US); Maunish Shah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/656,702

(22) Filed: May 7, 2024

(65) Prior Publication Data

US 2025/0348695 A1   Nov. 13, 2025

(51) Int. Cl.
*G06K 7/10* (2006.01)
*H04B 5/70* (2024.01)

(52) U.S. Cl.
CPC ........... *G06K 7/10297* (2013.01); *H04B 5/70* (2024.01)

(58) Field of Classification Search
CPC .............................. G06K 7/10297; H04B 5/70
USPC ....................................................... 235/451
See application file for complete search history.

(56) References Cited

U.S. PATENT DOCUMENTS

| 6,424,303 | B1* | 7/2002 | Tsai | G06F 1/1616 |
| | | | | 343/702 |
| 6,847,830 | B1* | 1/2005 | Vanderhelm | H01Q 1/2275 |
| | | | | 343/909 |
| 9,728,836 | B2* | 8/2017 | Feng | H01Q 1/243 |
| 2007/0285320 | A1* | 12/2007 | Hayes | H01Q 21/30 |
| | | | | 343/702 |
| 2010/0181382 | A1* | 7/2010 | Speich | G06K 19/07749 |
| | | | | 235/492 |
| 2024/0405796 | A1* | 12/2024 | Khawand | H04B 5/72 |

* cited by examiner

*Primary Examiner* — Ahshik Kim
(74) *Attorney, Agent, or Firm* — Joseph Mencher

(57) ABSTRACT

A computing-device-identification-tag-based wireless communication enablement/disablement system includes a computing device chassis, and a computing device identification tag that is moveably coupled to the computing device chassis such that the computing device identification tag is configured to be moved between a retracted orientation in which the computing device identification tag is housed in the computing device chassis, and an extended orientation in which the computing device identification tag extends from the computing device chassis. A wireless antenna is included on the computing device identification tag. A wireless communication enablement/disablement subsystem is included in the computing device chassis and is configured to disable wireless communications via the wireless antenna when the computing device identification tag is provided in the retracted orientation, and enable wireless communications via the wireless antenna when the computing device identification tag is provided in the extended orientation.

20 Claims, 14 Drawing Sheets

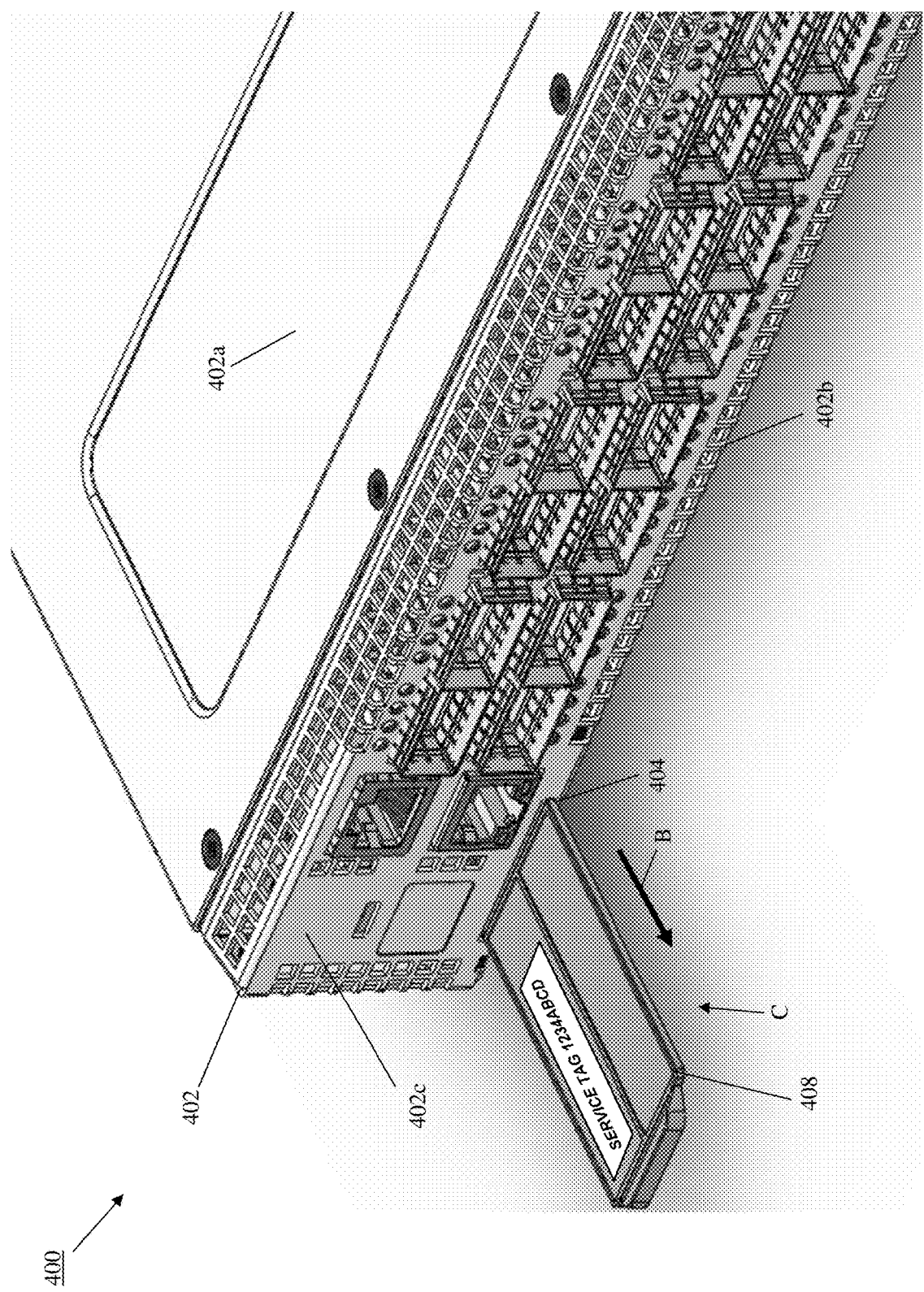

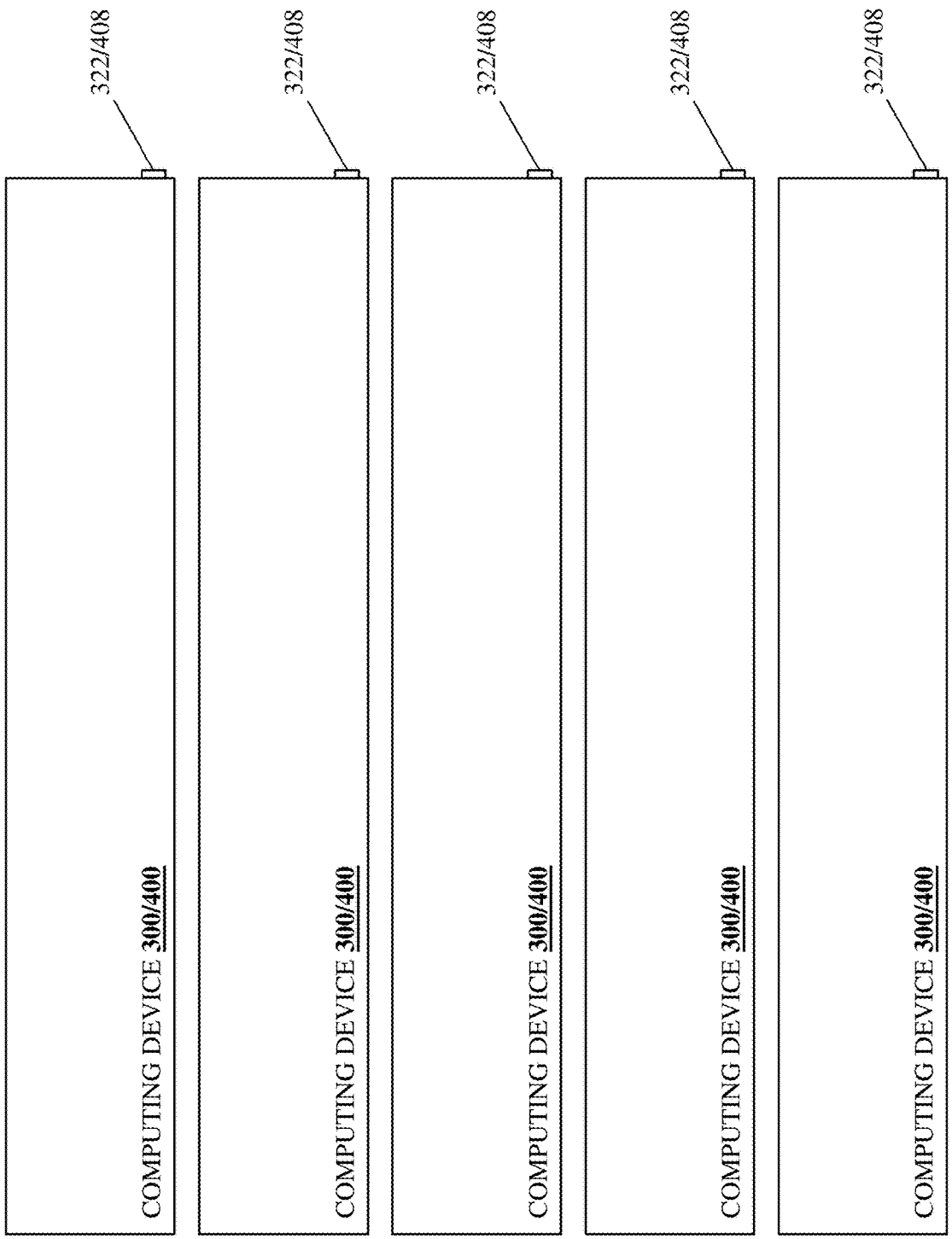

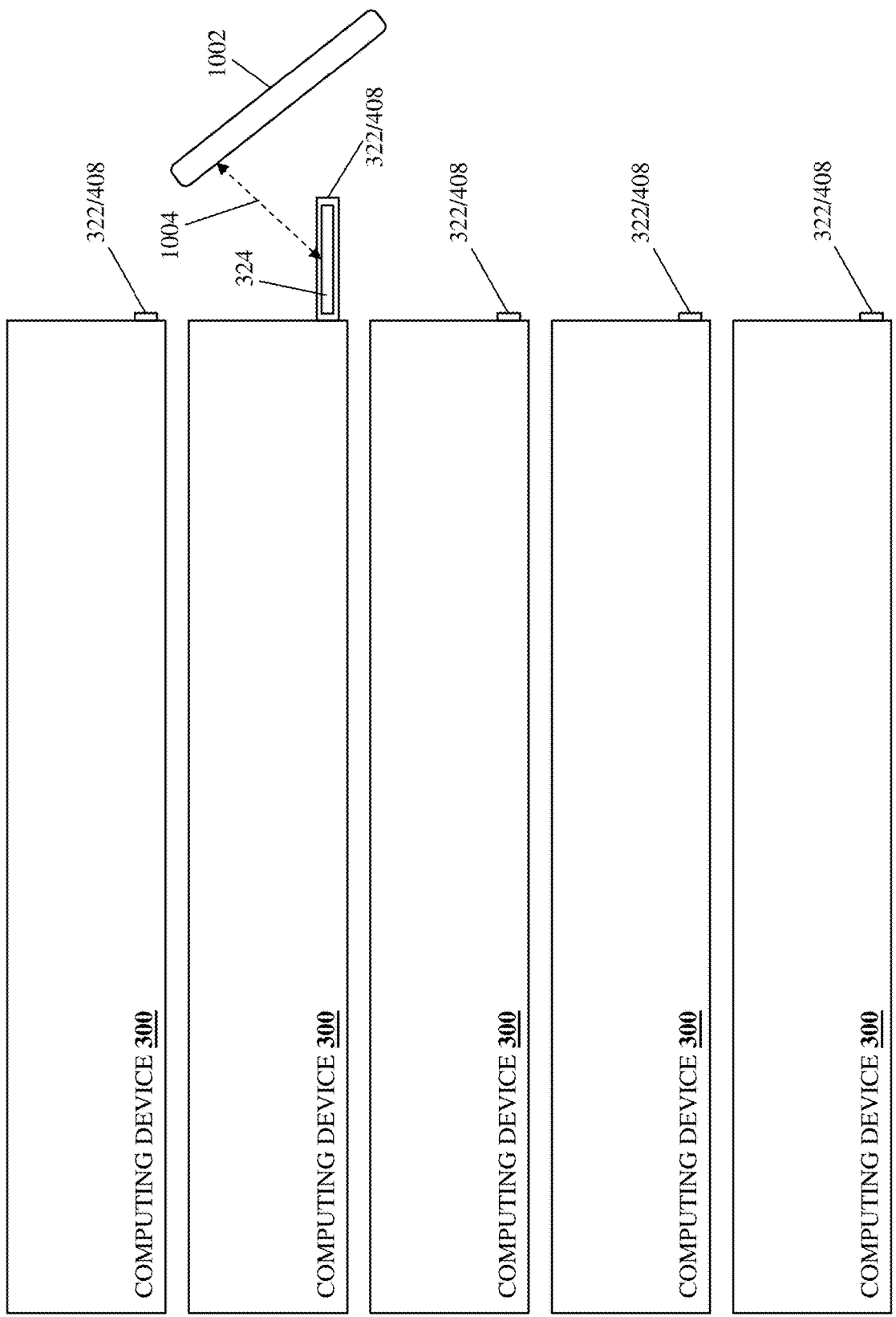

COMPUTING-DEVICE-IDENTIFICATION-TAG-BASED WIRELESS COMMUNICATION ENABLEMENT/DISABLEMENT SYSTEM

BACKGROUND

The present disclosure relates generally to information handling systems, and more particularly to enabling and disabling wireless communications using a computing device identification tag on an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices (e.g., switch devices), server devices, storage systems, and/or other computing devices known in the art, are sometimes configured to communicate wirelessly with a management device located adjacent those computing devices in order to transmit device status and/or management information to those management devices. For example, some conventional computing devices are configured with Near Field Communication (NFC) devices that utilize relatively low-speed NFC protocols (e.g., having bit-rates up to 424 kilobits/second) and employ magnetic field communication techniques over distances of approximately 4-10 centimeters to allow management devices positioned adjacent the computing device to retrieve the status and/or management information discussed above. However, the use of such wireless communications devices can raise issues.

For example, computing devices are often positioned in relatively close proximity to each other in racks and other multi-computing-device chassis, and the range of wireless communication devices like the NFC devices discussed above results in any management device positioned in the wireless communication range of a wireless communication device in a computing device being in wireless communication range of the wireless communication devices its adjacent computing devices. For example, networking devices and/or server devices in conventional racks are typically spaced approximately 4.5 centimeters apart, and thus a management device positioned adjacent any of those computing devices will be in range of the wireless communication devices in several of its adjacent computing devices as well. As such, a user of the management device intending to retrieve status and/or management information from (and/or otherwise communicate with) a computing device (e.g., an "intended" computing device) may retrieve status and/or management information from (or may otherwise communicate with) unintended computing devices positioned adjacent the intended computing device. Furthermore, wireless communication devices like those discussed above are subject to eavesdropping using specialized equipment (e.g., high-gain, long range antennas).

Accordingly, it would be desirable to provide a computing device wireless communication system that addresses the issues discussed above.

SUMMARY

According to one embodiment, an Information Handling System (IHS) includes a chassis; a processing system that is included in the chassis; a wireless communication subsystem that is included in the chassis, that is coupled to the processing system, and that is configured to transmit wireless communications; an identification tag that is moveably coupled to the chassis such that the identification tag is configured to be moved between a retracted orientation in which the identification tag is housed in the chassis, and an extended orientation in which the identification tag extends from the chassis; a wireless antenna that is included on the identification tag and coupled to the wireless communication subsystem; and a wireless communication enablement/disablement subsystem that is included in the chassis and that is configured to: disable wireless communications via the wireless antenna when the identification tag is provided in the retracted orientation; and enable wireless communications via the wireless antenna when the identification tag is provided in the extended orientation.

BRIEF DESCRIPTION OF THE DRAWINGS

FIG. 6A is a perspective view illustrating an embodiment of the computing device of FIGS. 4A and 4B with the computing-device-identification-tag-based wireless communication enablement/disablement system in the extended orientation.

FIG. 8A is a side view illustrating an embodiment of a plurality of the computing devices of FIG. 3 or 4A and 4B located adjacent each other with their respective computing-device-identification-tag-based wireless communication enablement/disablement systems provided in the retracted orientation.

FIG. 10B is a side view illustrating an embodiment of the plurality of computing devices of FIG. 9 with a management device positioned adjacent to, and communicating wirelessly with, the computing device having the computing-device-identification-tag-based wireless communication enablement/disablement system in the extended orientation.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
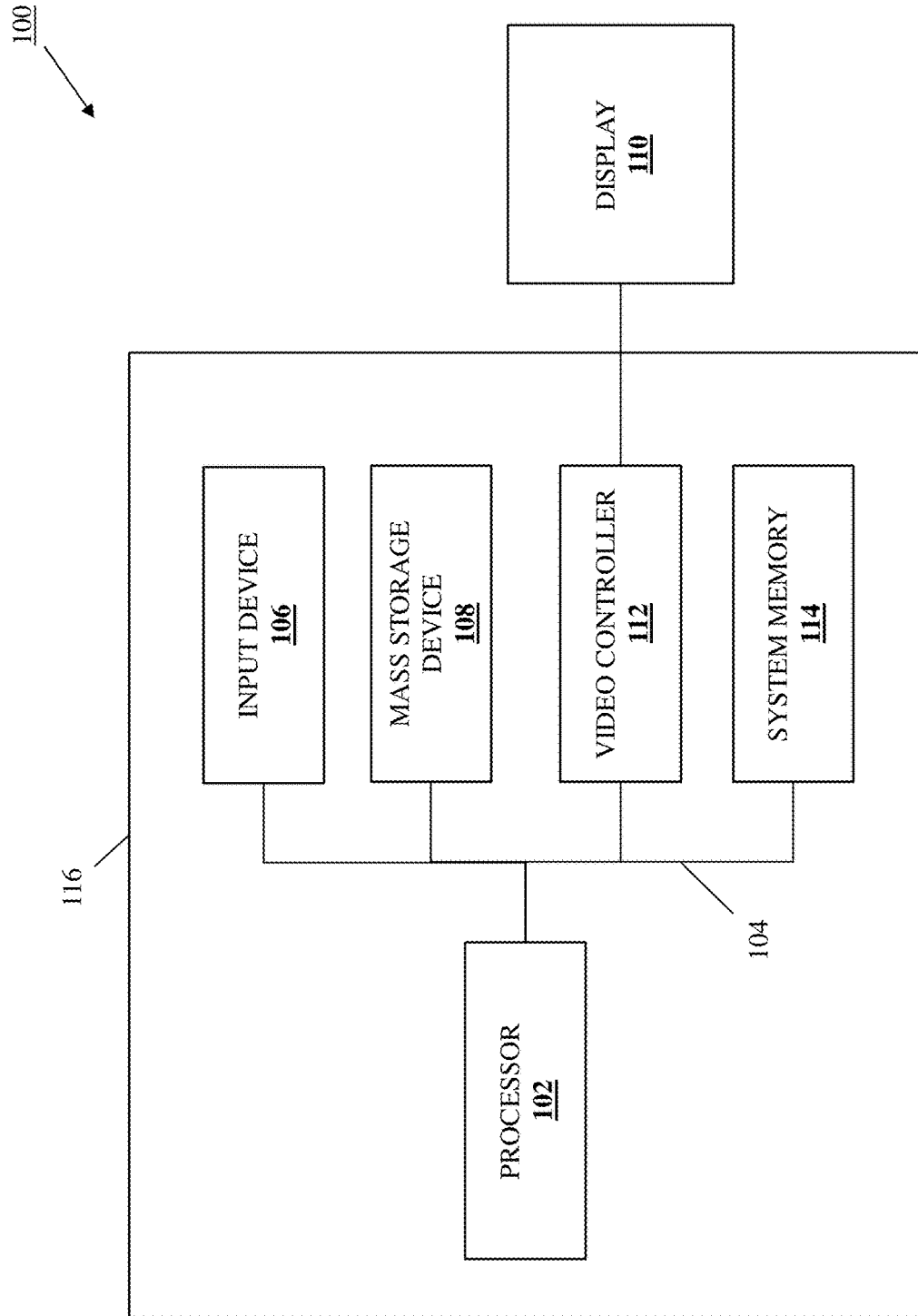
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
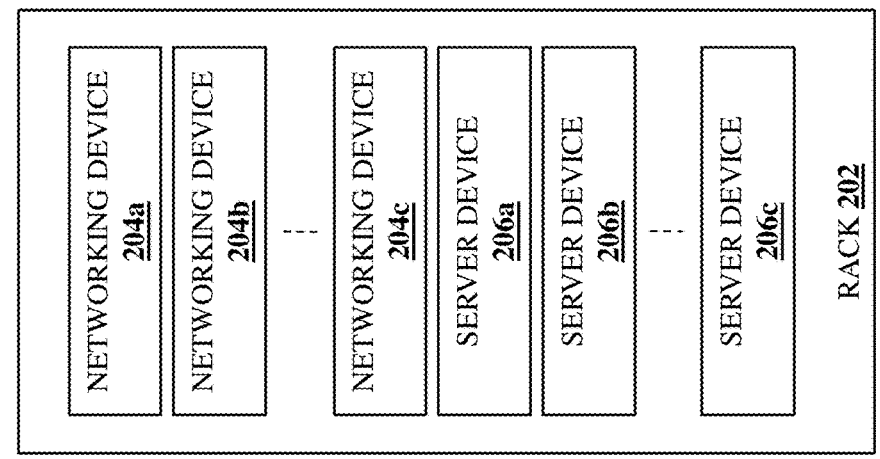
FIG. 2 is a schematic view illustrating an embodiment of a computing system with computing devices that may include the computing-device-identification-tag-based wireless communication enablement/disablement system of the present disclosure.

Referring now to FIG. 2, an embodiment of a computing system 200 having computing devices that may include the computing-device-identification-tag-based wireless communication enablement/disablement system of the present disclosure is illustrated. In the illustrated embodiment, the computing system 200 includes a rack 202 that houses the computing devices included in the computing system 200, and that one of skill in the art in possession of the present disclosure will appreciate may be provided by any of a variety of computing device racks (e.g., datacenter racks) known in the art. Furthermore, the rack 202 is illustrated as housing a plurality of computing devices that, in the examples provided below, include networking devices 204a, 204b, and up to 204c (e.g., switch devices), as well as server devices 206a, 206b, and up to 206c.

In an embodiment, any or each of the networking devices 204a-204c and server devices 206a-206c may be provided by the IHS 100 discussed above with reference to FIG. 1, and/or may include some or all of the components of the IHS 100. However, while illustrated and discussed as being provided by networking devices and server devices, one of skill in the art in possession of the present disclosure will recognize that computing devices provided in the computing system 200 may include any other devices (e.g., storage systems) that may be configured to operate similarly as the computing devices discussed below. However, while a specific computing system 200 having computing devices that may include the computing-device-identification-tag-based wireless communication enablement/disablement system of the present disclosure has been illustrated and described, one of skill in the art in possession of the present disclosure will recognize that the computing-device-identification-tag-based wireless communication enablement/disablement system of the present disclosure may be utilized with computing devices in a variety of manners that will fall within the scope of the present disclosure as well.

Figure 3:
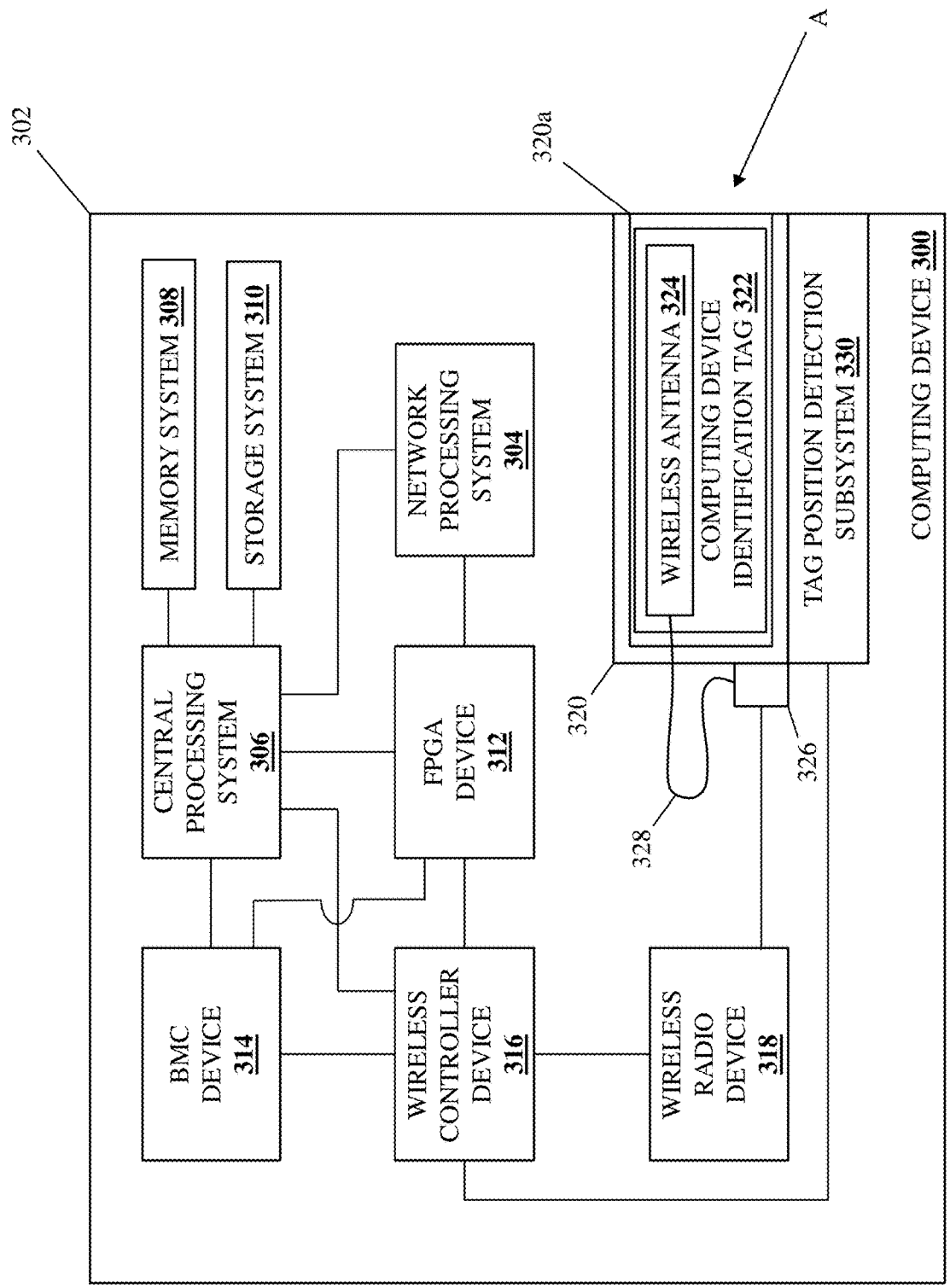
FIG. 3 is a schematic view illustrating an embodiment of a computing device that may be included in the computing system of FIG. 2, and that includes the computing-device-identification-tag-based wireless communication enablement/disablement system of the present disclosure in a retracted orientation.

Referring now to FIG. 3, an embodiment of a computing device 300 is illustrated that may provide an of the networking devices 204a-204c and/or server devices 206a-206c discussed above with reference to FIG. 2. As such, the computing device 300 may be provided by the IHS 100 discussed above with reference to FIG. 1 and/or may include some or all of the components of the IHS 100. Furthermore, while illustrated and discussed as being provided by networking devices (e.g., switch devices) or server devices, one of skill in the art in possession of the present disclosure will recognize that the functionality of the computing device 300 discussed below may be provided by other devices that are configured to operate similarly as the computing device 300 discussed below.

In the illustrated embodiment, the computing device 300 includes a chassis 302 that houses the components of the computing device 300, only some of which are illustrated and described below. In specific examples provided below, the computing device 300 is illustrated and described as being provided by a networking device such as a switch device, and the chassis 302 houses a network processing system 304 (e.g., a Network Processing Unit (NPU)) that may be configured to perform any of a variety of networking functionality that would be apparent to one of skill in the art in possession of the present disclosure.

The chassis 302 also houses a central processing system 306 (e.g., a Central Processing Unit (CPU)) that is coupled to the network processing system 304. The chassis 302 also houses a memory system 308 and a storage system 310 that are each coupled to the central processing system 306, and one of skill in the art in possession of the present disclosure will appreciate how the central processing system 306 may be configured to use the memory system 308 and a storage system 310 to perform any of a variety of non-networking functionality (e.g., providing a Networking Operating System (NOS)) for the networking device that provides the computing device 300 in the examples below. The chassis 302 also houses the Field Programmable Gate Array (FPGA) device that is coupled to each of the central processing system and the network processing system 304, and a Baseboard Management Controller (BMC) device 314 that is coupled to the central processing system 306 and the FPGA device 312 and configured to perform any of a variety of management functionality for the networking device that provides the computing device 300 in the examples below.

The chassis 302 may also house a wireless communication subsystem that, in the illustrated examples provided herein, include a wireless controller device 316 coupled to a wireless radio device 318, with the wireless controller device 316 coupled to the central processing system 306, the FPGA device 312, and the BMC device 314. In the specific examples described below, the wireless communication subsystem is provided by a Near Field Communication (NFC) subsystem having an NFC controller and NFC radio, but one of skill in the art in possession of the present disclosure will appreciate how Bluetooth subsystems, WiFi subsystems, and/or other wireless communication subsystems will fall within the scope of the present disclosure as well.

The chassis 302 may also include a computing device identification tag housing 320 that defines a computing device identification tag entrance 320a on a surface of the chassis 302. As illustrated, a computing device identification tag 322 may be included in the computing device identification tag housing 320, and as discussed below may be moveably coupled to the computing device identification tag housing 320 between a retracted orientation A illustrated in FIG. 3 (i.e., retracted into the chassis 302 of the computing device 300) and an extended orientation illustrated and described in further detail below. Furthermore, a wireless antenna 324 is included on the computing device identification tag 322, and one of skill in the art in possession of the present disclosure will appreciate how the wireless antenna 322 may be integrated into the body of the computing device identification tag 322, connected (e.g., adhered) to a surface of the computing device identification tag 322, and/or provided in the computing device identification tag 322 in a variety of other manners while remaining within the scope of the present disclosure.

As illustrated, a wireless antenna/wireless radio device coupling 326 is included in the chassis 302 and coupled to the wireless radio device 318, and a flexible cable 328 or other coupling may couple the wireless antenna/wireless radio device coupling 326 to the wireless antenna 324 in order to provide for the coupling of the wireless antenna 324 to the wireless radio device 318 while allowing movement of the wireless antenna 324 relative to the wireless radio device 318 as illustrated and described in further detail below. In the illustrated embodiment, a tag position detection subsystem 330 may be provided in the chassis 302 adjacent the computing device identification tag housing 320, and may be coupled to the wireless controller device 316. As described in further detail below, the tag position detection subsystem 330 may be provided by an electromechanical sensor that is configured to engage the computing device identification tag 322 when the computing device identification tag 322 is in the retracted orientation A, by an optical sensor that is configured to generate a light that is interrupted by the computing device identification tag 322 when the computing device identification tag 322 is in the retracted orientation A, and/or by any of a variety of other sensors or detection subsystems that one of skill in the art in possession of the present disclosure will recognize as providing for the detection of the computing device identification tag 322 when the computing device identification tag 322 is in the retracted orientation A as described below.

As described below, a wireless communication enablement/disablement subsystem may be provided in the chassis 302 using the computing device identification tag housing, the tag position detection subsystem 330 and/or the wireless controller device, combinations thereof, and/or using other techniques that would be apparent to one of skill in the art in possession of the present disclosure. For example, the wireless communication enablement/disablement subsystem of the present disclosure may provide "passive" wireless communication enablement/disablement functionality that utilizes a magnetic field generated by the wireless antenna 324 to produce Eddy currents in the computing device identification tag housing 320 that create an opposing magnetic field that obstructs wireless communications via the wireless antenna 324 when the computing device identification tag 322 is provided in the retracted orientation A (e.g., thus cancelling out the magnetic field communication techniques utilized by the NFC subsystem to communicate via the wireless antenna 324 as described above).

In another example, the wireless communication enablement/disablement subsystem may be configured to disable wireless communication transmission by the wireless controller device 316 via the wireless antenna 324 when the tag position detection subsystem 330 identifies to the wireless communication enablement/disablement subsystem that the computing device identification tag 322 is provided in the retracted orientation A, as well as to enable wireless communication transmission by the wireless controller device 316 via the wireless antenna 324 when the tag position detection subsystem 330 identifies to the wireless communication enablement/disablement subsystem that the computing device identification tag 322 is provided in the extended orientation described in further detail below. Furthermore, one of skill in the art in possession of the present disclosure will appreciate how the wireless communication enablement/disablement subsystem may utilize both the wireless antenna wireless communication obstruction functionality provided by the computing device identification tag housing 320 and the wireless communication transmission disablement functionality provided by the wireless controller device 316/tag position detection subsystem 330 while remaining within the scope of the present disclosure as well.

Figure 4A:
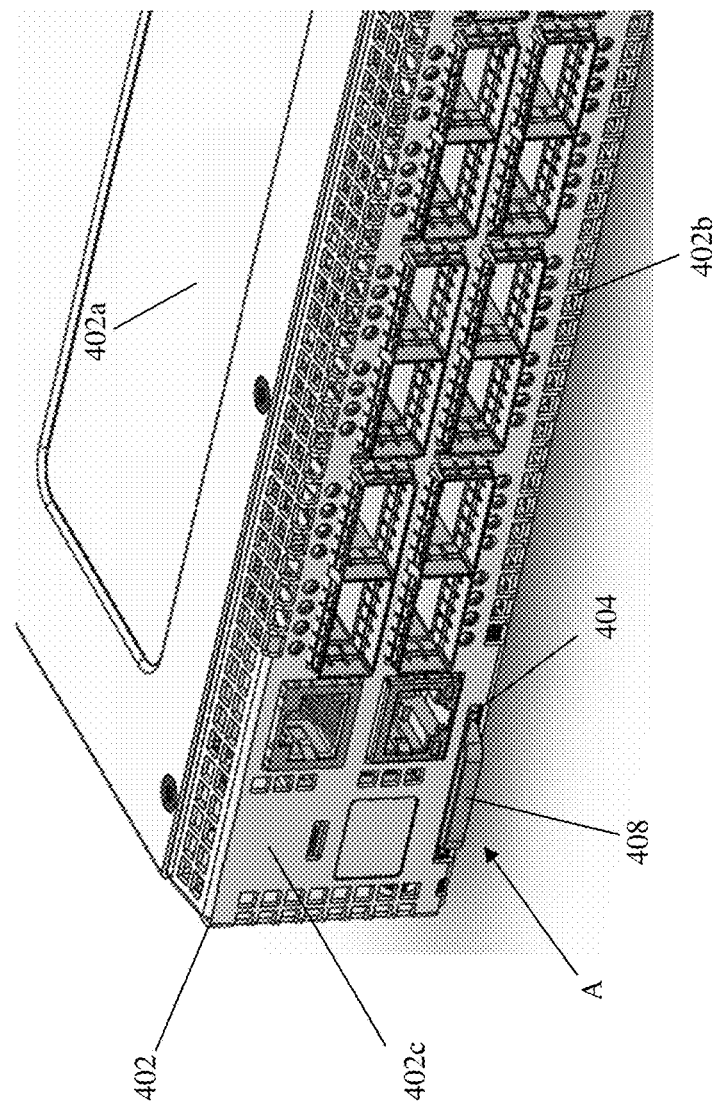
FIG. 4A is a perspective view illustrating an embodiment of the computing device of FIG. 3 with the computing-device-identification-tag-based wireless communication enablement/disablement system in the retracted orientation.
Figure 4B:
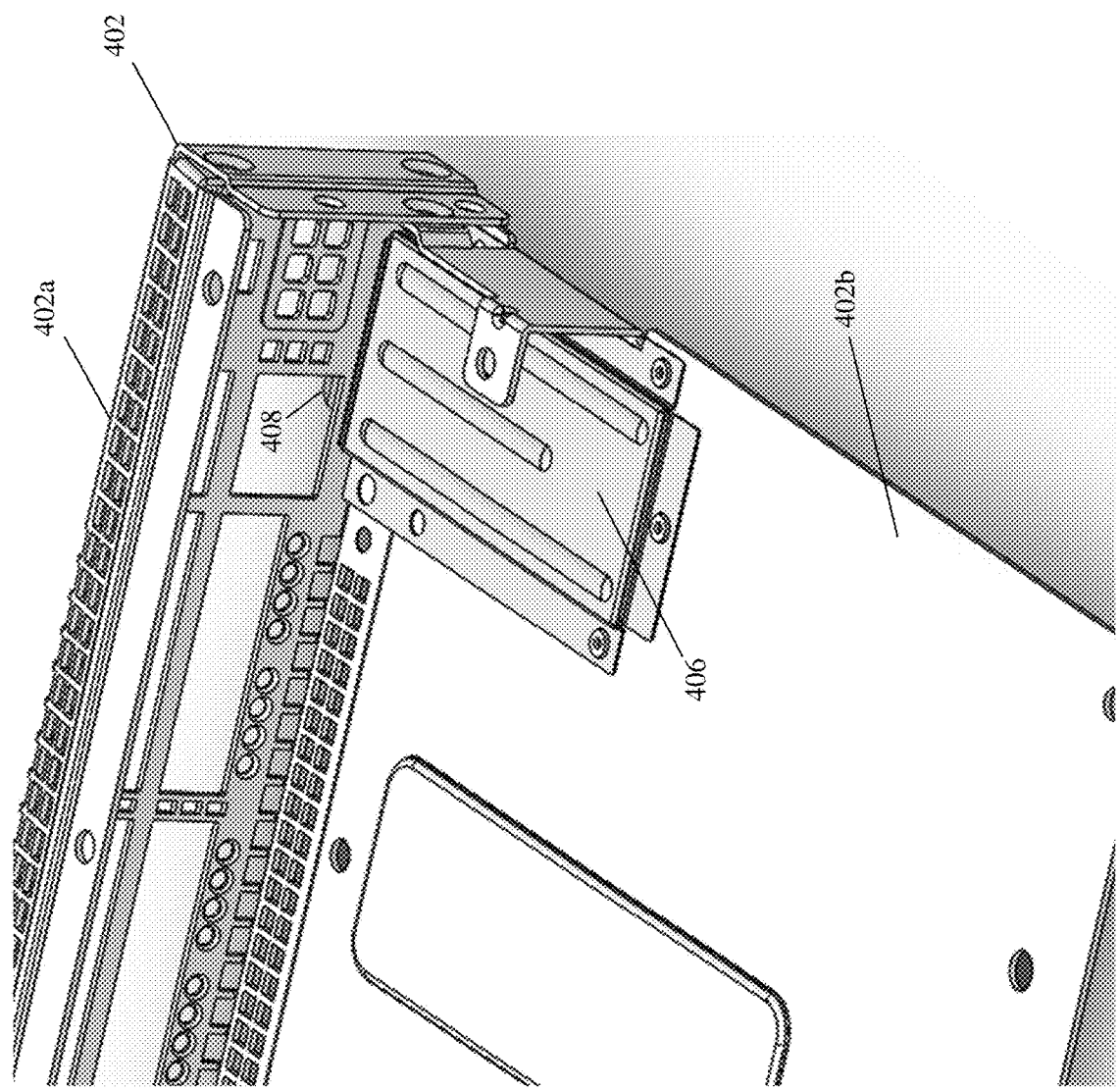
FIG. 4B is a perspective view illustrating an embodiment of the computing device of FIG. 3 with the computing-device-identification-tag-based wireless communication enablement/disablement system in the retracted orientation.

With reference to FIGS. 4A and 4B, an embodiment of a computing device 400 is illustrated that may provide the computing device 300 discussed above with reference to FIG. 3. The computing device 400 includes a chassis 402 that may provide the chassis 302 discussed above with reference to FIG. 3, with the chassis 402 including a top wall 402a, a bottom wall 402b that is located opposite the chassis 402 from the top wall 402a, and a front wall 402c that extends between the top wall 402a and the bottom wall 402b. As illustrated, the front wall 402c may define a computing device identification tag entrance 404 that may provide the computing device identification tag entrance 320a discussed above with reference to FIG. 3, and a computing device identification tag housing 406 is included in the chassis 402 adjacent the computing device identification tag entrance 404. Furthermore, in the embodiments illustrated in FIGS. 4A and 4B, a computing device identification tag 408 is included in the computing device identification tag housing 406 in the retracted orientation A.

Figure 5:
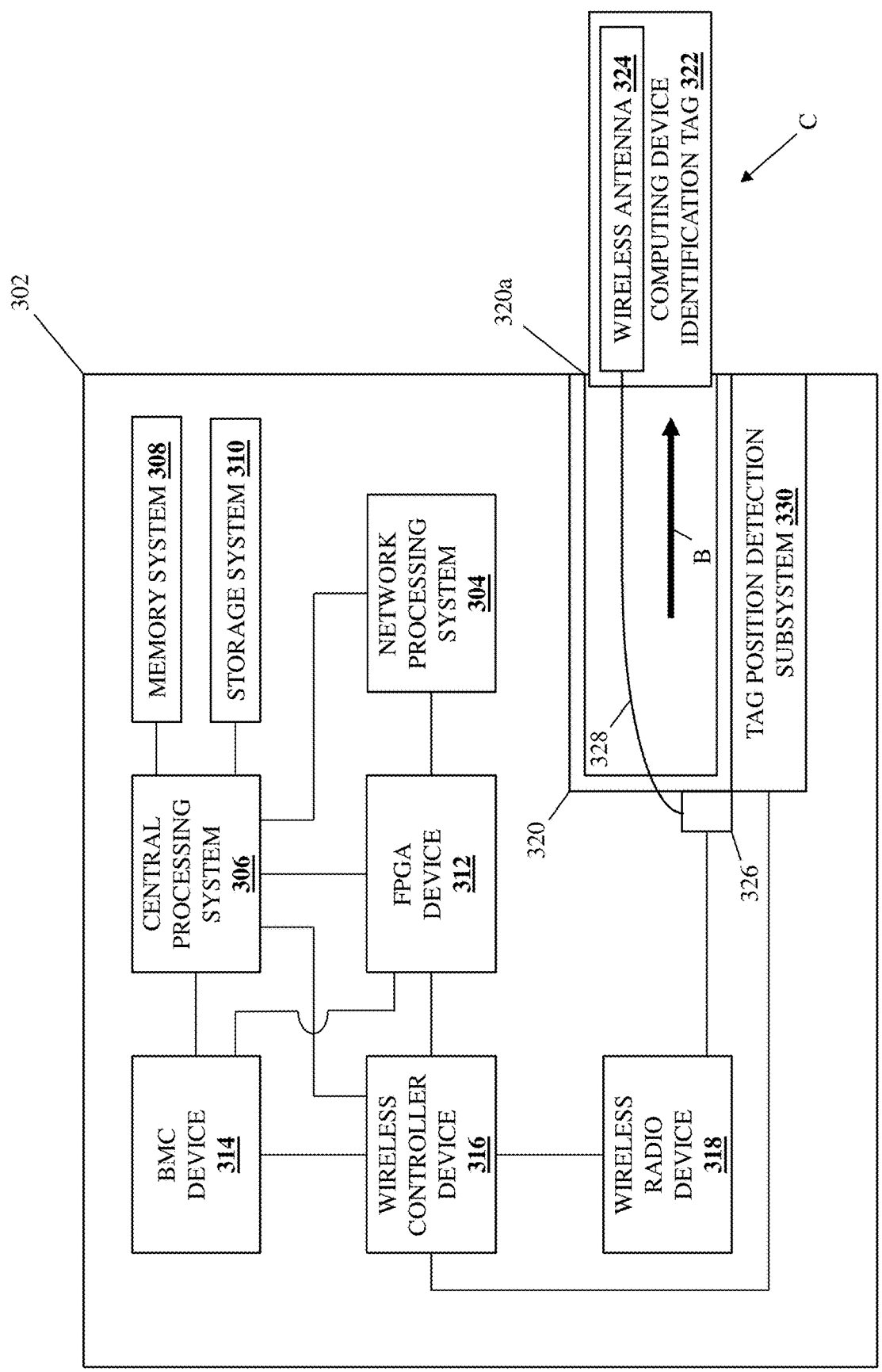
FIG. 5 is a schematic view illustrating an embodiment of the computing device of FIG. 3 with the computing-device-identification-tag-based wireless communication enablement/disablement system of the present disclosure in an extended orientation.

FIG. 5 illustrates how the computing device identification tag 322 may be moved (via its movable coupling to the computing device identification tag housing 320) in a direction B and out of the computing device identification tag housing 320 via the computing device identification tag entrance 320a such that it is provided in an extended orientation C. Similarly, FIGS. 6A and 6B illustrate how the computing device identification tag 408 may be moved (via its movable coupling to the computing device identification tag housing 406) in the direction B and out of the computing device identification tag housing 406 via the computing device identification tag entrance 404 such that it is provided in the extended orientation C.

Figure 6B:
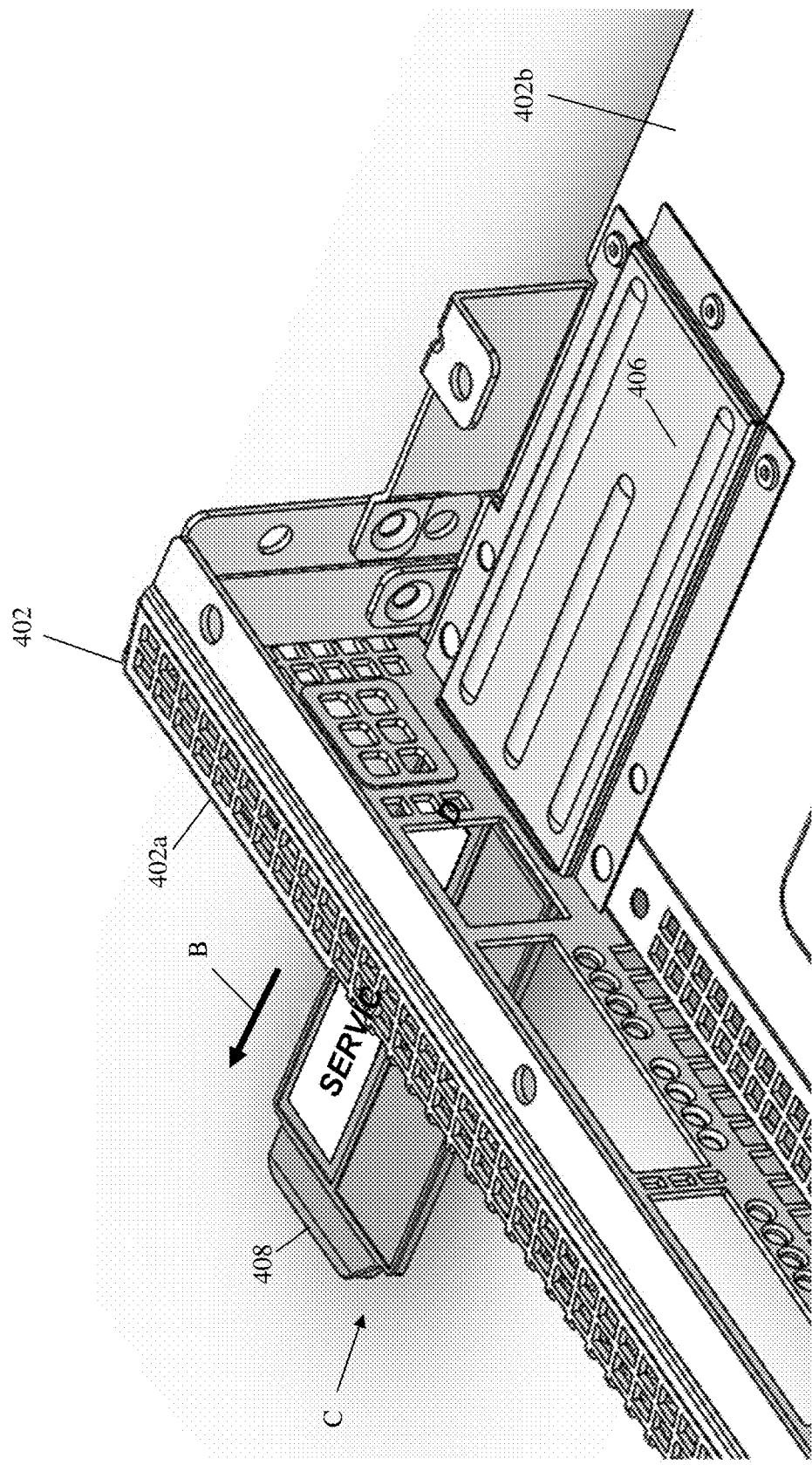
FIG. 6B is a perspective view illustrating an embodiment of the computing device of FIGS. 4A and 4B with the computing-device-identification-tag-based wireless communication enablement/disablement system in the extended orientation.

Furthermore, FIGS. 6A and 6B illustrate how the computing device identification tag 408 (or the computing device identification tag 322) may include computing device identification information about the computing device 400 (or the computing device 300) that is visible on its surface (e.g., a "service tag" that is configured to uniquely identify that computing device to a computing device provider and that may be etched onto, printed on, adhered to, and/or otherwise provided on the computing device identification tag using any of a variety of techniques that would be apparent to one of skill in the art in possession of the present disclosure). As such, one of skill in the art in possession of the present disclosure will recognize how the computing device identification tag 322 and/or 408 may be provided by computing device "luggage tags" that are provided on computing device chassis by computing device providers, and that a user of the computing device 300 and/or 400 may pull out of the chassis 302 and/or 402 to identify the computing device identification information. However, while specific computing devices 300 and 400 have been illustrated and described, one of skill in the art in possession of the present disclosure will recognize that the computing-device-identification-tag-based wireless communication enablement/disablement system of the present disclosure may include a variety of components and/or component configurations, and may be provided on a variety of computing devices, in order to enable the computing-device-identification-tag-based wireless communication enablement/disablement functionality discussed below while remaining within the scope of the present disclosure as well.

Figure 7:
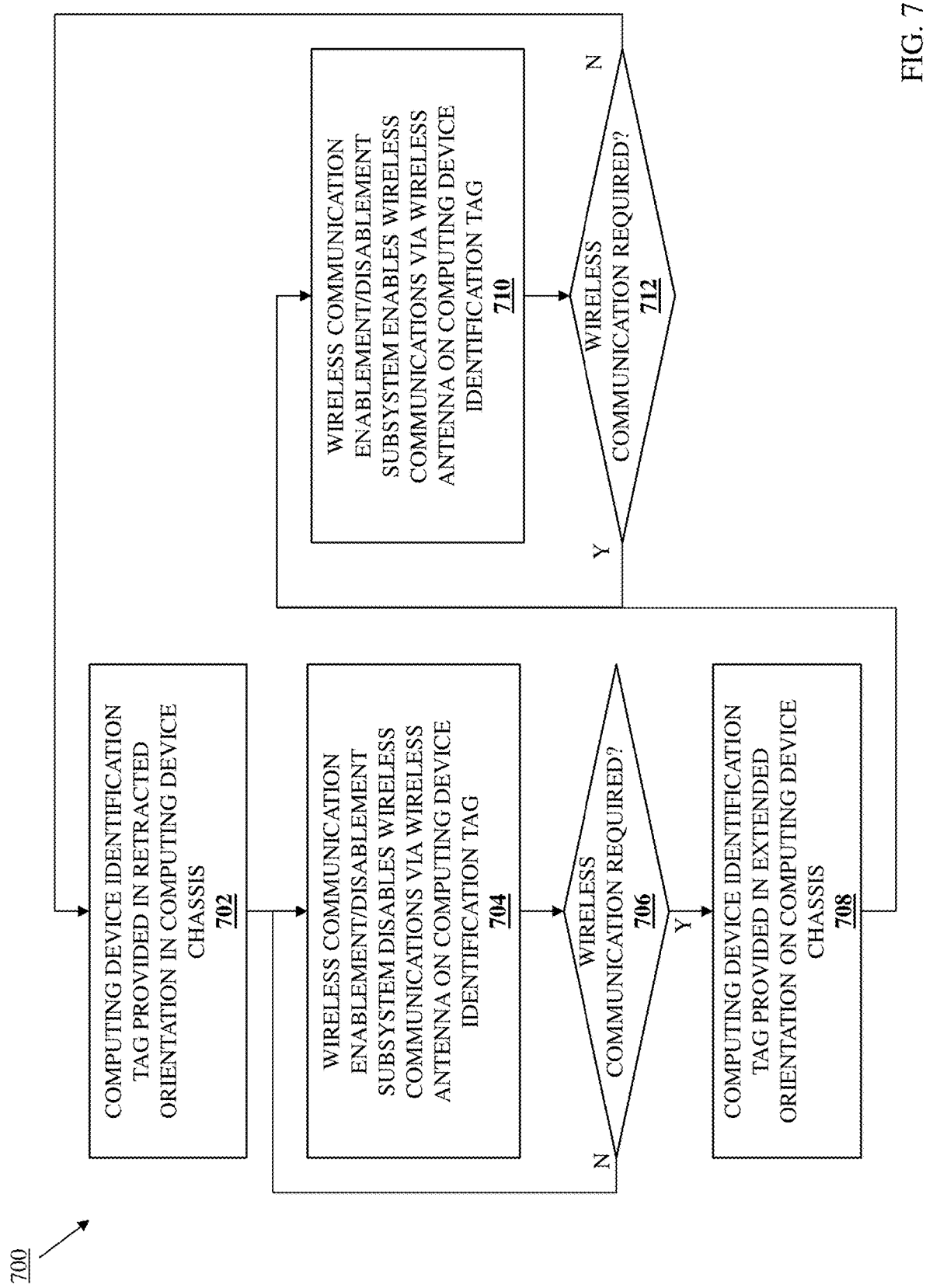
FIG. 7 is a flow chart illustrating an embodiment of a method for enabling and disabling wireless communications by a computing device using a computing device identification tag.

Referring now to FIG. 7, an embodiment of a method 700 for enabling and disabling wireless communications by a computing device using a computing device identification tag is illustrated. As discussed below, the systems and methods of the present disclosure provide a wireless antenna for a wireless communication subsystem in a computing device identification tag that is moveable between a retracted orientation within a computing device chassis and an extended orientation outside of the computing device chassis, with wireless communication enabled via the wireless antenna when the computing device identification tag is in the extended orientation, and disabled when the computing device identification tag is in the retracted orientation. For example, the computing-device-identification-tag-based wireless communication enablement/disablement system of the present disclosure may include a computing device chassis, and a computing device identification tag that is moveably coupled to the computing device chassis such that the computing device identification tag is configured to be moved between a retracted orientation in which the computing device identification tag is housed in the computing device chassis, and an extended orientation in which the computing device identification tag extends from the computing device chassis. A wireless antenna is included on the computing device identification tag. A wireless communication enablement/disablement subsystem is included in the computing device chassis and is configured to disable wireless communications via the wireless antenna when the computing device identification tag is provided in the retracted orientation, and enable wireless communications via the wireless antenna when the computing device identification tag is provided in the extended orientation. As such, the systems and methods described herein address issues with conventional wireless communications with computing device in close proximity with each other.

The method 700 begins at block 702 where a computing device identification tag is provided in a retracted orientation in a computing device chassis. With reference to FIG. 8A, as well as FIGS. 3, 4A, and 4B discussed above, in an embodiment of block 702 a plurality of the computing devices 300/400 discussed above may be positioned adjacent each other. For example, the computing devices 300/400 may provide the networking devices 204a-204c and server devices 206a-206c positioned adjacent each other in the rack 202 discussed above with reference to FIG. 2, although other computing devices provided in other configurations will fall within the scope of the present disclosure as well. As can be seen in FIG. 8A, the computing device identification tag 322/408 on each computing device 300/400 may be provided in the retracted orientation A illustrated and discussed in detail with reference to FIGS. 3, 4A, and 4B above. As will be appreciated by one of skill in the art in possession of the present disclosure, the computing device identification tag 322/408 on each computing device 300/400 may be provided in the retracted orientation A in situations in which the computing device identification information on any of those computing device identification tags 322/408 is not needed by a user of their computing device 300/400, in situations in which wireless communication is not required with that computing device 300/400, and/or in other situations that would be apparent to one of skill in the art in possession of the present disclosure.

The method 700 then proceeds to block 704 where a wireless communication enablement/disablement subsystem disables wireless communications via a wireless antenna on the computing device identification tag. With continued reference to FIGS. 3, 4A, 4B, and 8A, in an embodiment of block 704 and in response to the computing device identification tags 322/408 on the computing devices 300/400 being provided in the retracted orientation A, the wireless communication enablement/disablement subsystem in each computing device 300/400 may operate to disable wireless communications via the wireless antenna 324 included on its computing device identification tag 322/408. In some examples of block 704, the wireless communication enablement/disablement subsystem of the present disclosure may provide "passive" wireless communication enablement/disablement functionality that utilizes a magnetic field generated by the wireless antenna 324 to produce Eddy currents in the computing device identification tag housing 320/406 that create an opposing magnetic field that obstructs wireless communications attempted via the wireless antenna 324 while the computing device identification tag 322/408 is provided in the retracted orientation A (e.g., thus cancelling out the magnetic field communication techniques utilized by the NFC subsystem to communicate via the wireless antenna 324 as described above).

Furthermore, one of skill in the art in possession of the present disclosure will appreciate that the "passive" wireless communication obstruction techniques described above (or other similar wireless communication obstruction techniques that would be apparent to one of skill in the art in possession of the present disclosure) need not prevent or otherwise obstruct all wireless communications via the wireless antenna 324, and rather may operate to obstruct a percentage of those wireless communications (e.g., a majority of those wireless communications) in order to prevent those wireless communications from, for example, allowing the transmission of an amount of computing device information from a computing device 300/400 that would allow a status of the computing device 300/400 to be determined, allow for the management of that computing device 300/400, and/or otherwise allow that computing device information to be used. As such, one of skill in the art in possession of the present disclosure will appreciate how the computing device identification tag housing 320/406 may be designed or otherwise configured variety of manners to obstruct a desired amount of wireless communication via the wireless antenna 324.

Figure 8B:
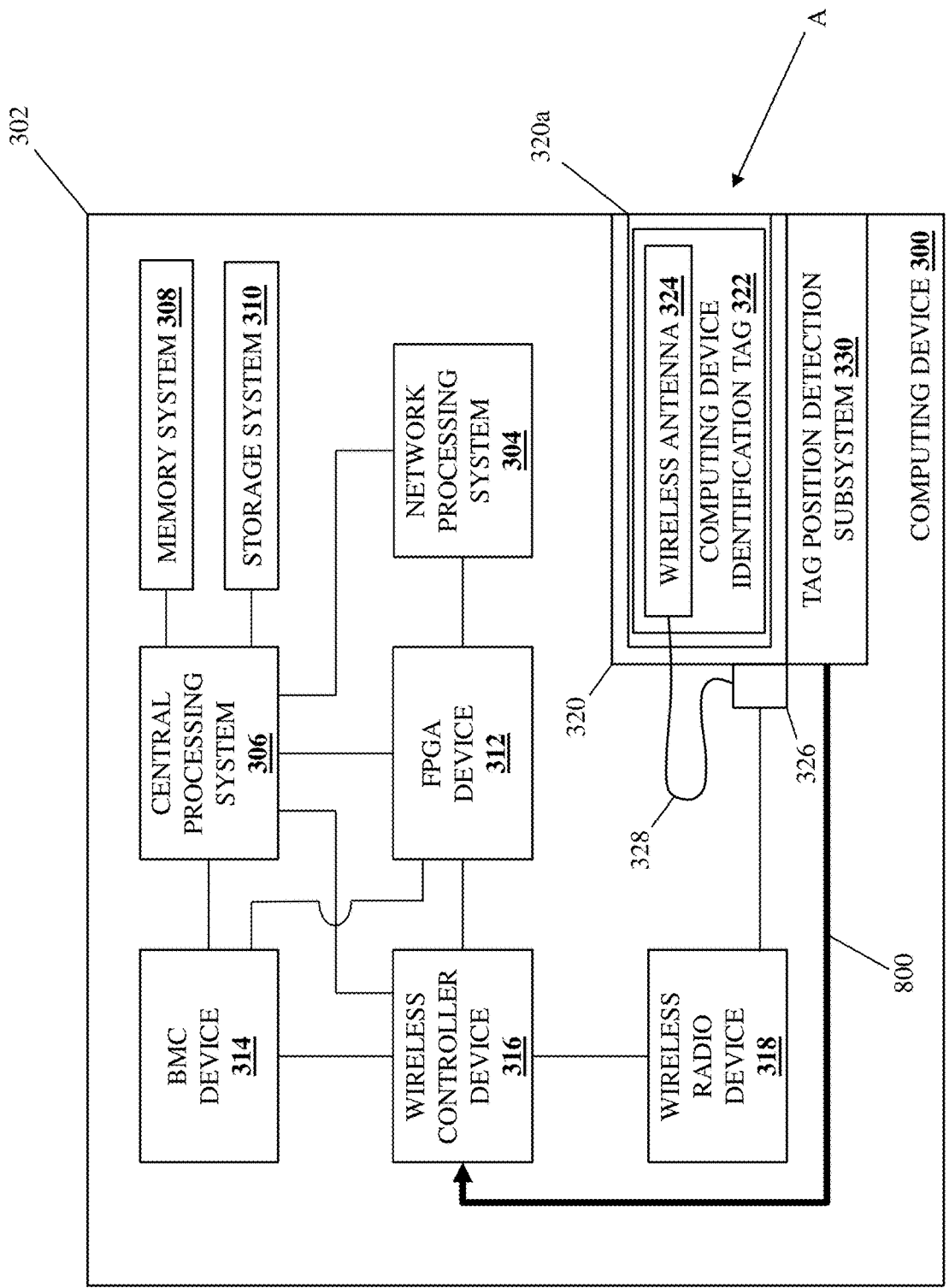
FIG. 8B is a schematic view illustrating an embodiment of the computing-device-identification-tag-based wireless communication enablement/disablement system on the computing device of FIG. 3 operating during the method of FIG. 7.

With reference to FIG. 8B, in other examples of block 704, the tag position detection subsystem 330 in the wireless communication enablement/disablement subsystem may perform tag position identification operations 800 that include identifying to the wireless communication enablement/disablement subsystem (e.g., provided by the wireless controller device 316 in this embodiment) that the computing device identification tag is provided in the retracted orientation A (e.g., via the electro-mechanical sensor techniques described above, via the optical sensor techniques described above, etc.), and in response the wireless communication enablement/disablement subsystem may disable wireless communication transmission by the wireless controller device 316 via the wireless antenna 324. Furthermore, as will be appreciated by one of skill in the art in possession of the present disclosure, in other examples the wireless communication enablement/disablement subsystem may disable wireless communication transmission by the wireless radio device 318 via the wireless antenna 324 at block 704 while remaining within the scope of the present disclosure as well.

Further still, one of skill in the art in possession of the present disclosure will appreciate how the wireless communication enablement/disablement subsystem may utilize both the wireless antenna wireless communication obstruction functionality provided by the computing device identification tag housing 320/406 and the wireless communication transmission disablement functionality provided by the wireless controller device 316/tag position detection subsystem 330 while remaining within the scope of the present disclosure as well. As such, with the computing device identification tags 322/408 on the computing devices 300/400 provided in the retracted orientation A, wireless communications with those computing devices 300/400 is prevented, enhancing the security of those computing devices 300/400 relative to conventional computing devices that utilize conventional wireless communications subsystems (e.g., by preventing eavesdropping from a distance using high-gain antennas and/or other eavesdropping devices).

The method 700 then proceeds to decision block 706 where the method 700 proceeds depending on whether wireless communication is required by a network administrator or other user of the computing device. As will be appreciated by one of skill in the art in possession of the present disclosure, a network administrator or other user of the computing devices 300/400 discussed above with reference to FIG. 8A may require wireless communications with any of those computing devices 300/400 in order to retrieve a status of that computing device 300/400, perform management operations with that computing device 300/400, and/or for any of a variety of other wireless communication reasons known in the art. As such, one of skill in the art in possession of the present disclosure will appreciate how a network administrator or other user of the computing device 300 must proceed to block 708 of the method 700 in order to enable that wireless communication, as the computing-device-identification-tag-based wireless communication enablement/disablement system of the present disclosure will not allow such wireless communications otherwise. If, at decision block 706, wireless communication is not required by a network administrator or other user of the computing device, the method 700 returns to block 704. As such, the method 700 may loop such that the wireless communication enablement/disablement subsystem in each of the computing devices 300/400 continues to disable wireless communications via the wireless antenna 324 on its computing device identification tag 322/408 as long as that computing device identification tag 322/408 is provided in the retracted orientation A.

Figure 9:
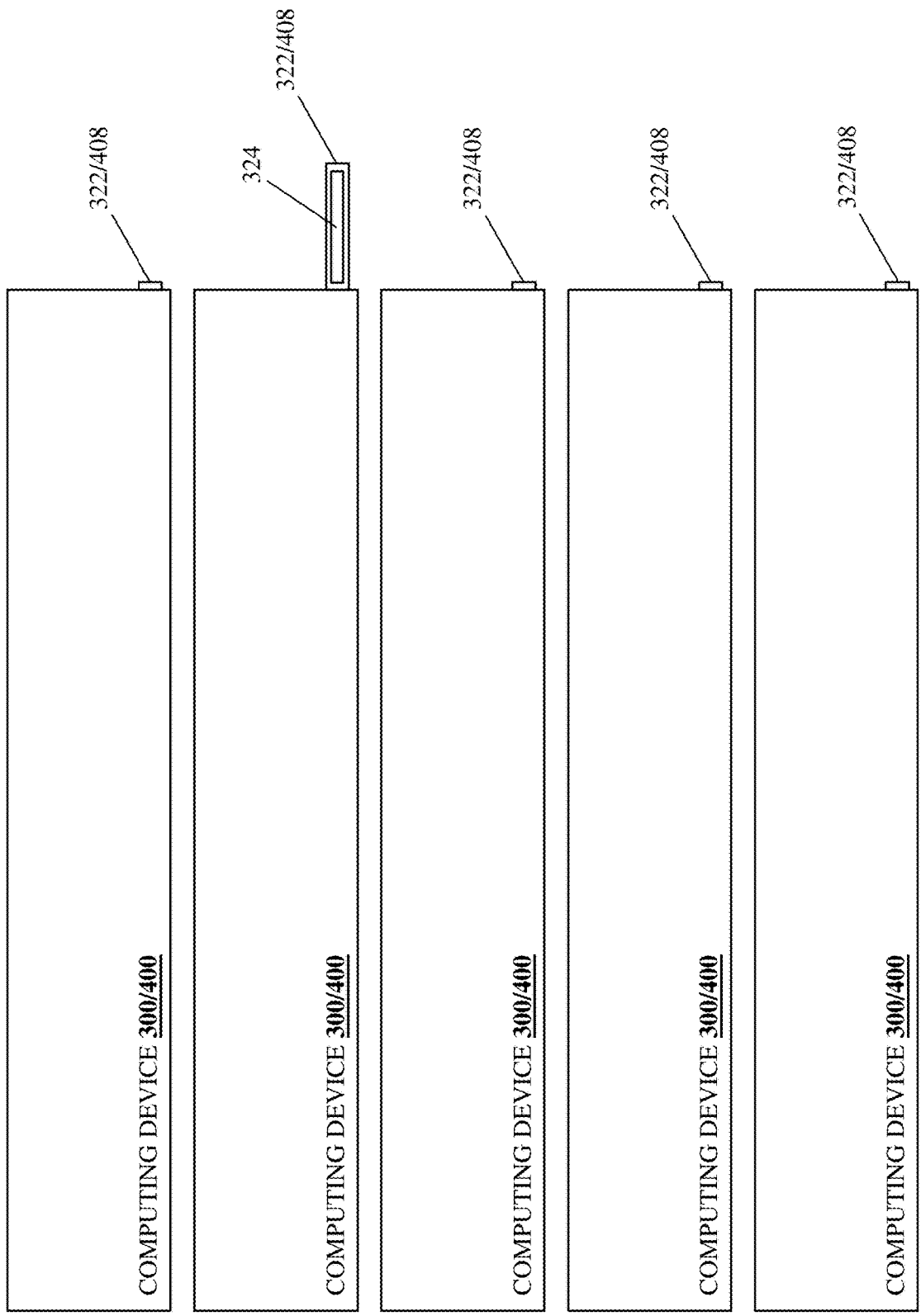
FIG. 9 is a side view illustrating an embodiment of the plurality of computing devices of FIG. 8 with the computing-device-identification-tag-based wireless communication enablement/disablement system on one of those computing devices provided into the extended orientation.

If, at decision block 706, wireless communication is required by a network administrator or other user of the computing device, the method 700 proceeds to block 708 where the computing device identification tag is provided in an extended orientation in the computing device chassis. With reference to FIG. 9, as well as FIGS. 5, 6A, and 6B discussed above, in an embodiment of block 708 a user of the computing devices 300/400 may require wireless communications with one of the computing devices 300/400 (i.e., the second computing device 300/400 from the "top" in FIG. 9 in the examples provided below) and, in response, the user may move the computing device identification tag 322/408 on that computing device 300/400 in the direction B (e.g., by "pulling" that computing device identification tag 322/408 out of the computing device identification tag housing 320 via the computing device identification tag entrance 320a/404) to provide that computing device identification tag 322/408 in the extended orientation C illustrated and discussed in detail with reference to FIGS. 5, 6A, and 6B above.

The method 700 then proceeds to block 710 where the wireless communication enablement/disablement subsystem enables wireless communications via the wireless antenna on the computing device identification tag. With continued reference to FIGS. 5, 6A, and 6B, in an embodiment of block 710 and in response to the computing device identification tag 322/408 on the computing devices 300/400 of FIG. 9 being provided in the extended orientation C, the wireless communication enablement/disablement subsystem in that computing device 300/400 may operate to enable wireless communications via the wireless antenna 324 included on its computing device identification tag 322/408. As will be appreciated by one of skill in the art in possession of the present disclosure, in some examples of block 710 and in embodiments in which the wireless communication enablement/disablement subsystem of the present disclosure provides the "passive" wireless communication enablement/disablement functionality described above, the movement of the computing device identification tag 322/408 out of the computing device identification tag housing 320/406 and into the extended orientation C will prevent the magnetic field generated by the wireless antenna 324 from producing the Eddy currents in the computing device identification tag housing 320 that operate to obstruct wireless communications via the wireless antenna 324 when the computing device identification tag 322/408 is located in the computing device identification tag housing 320/406.

Figure 10A:
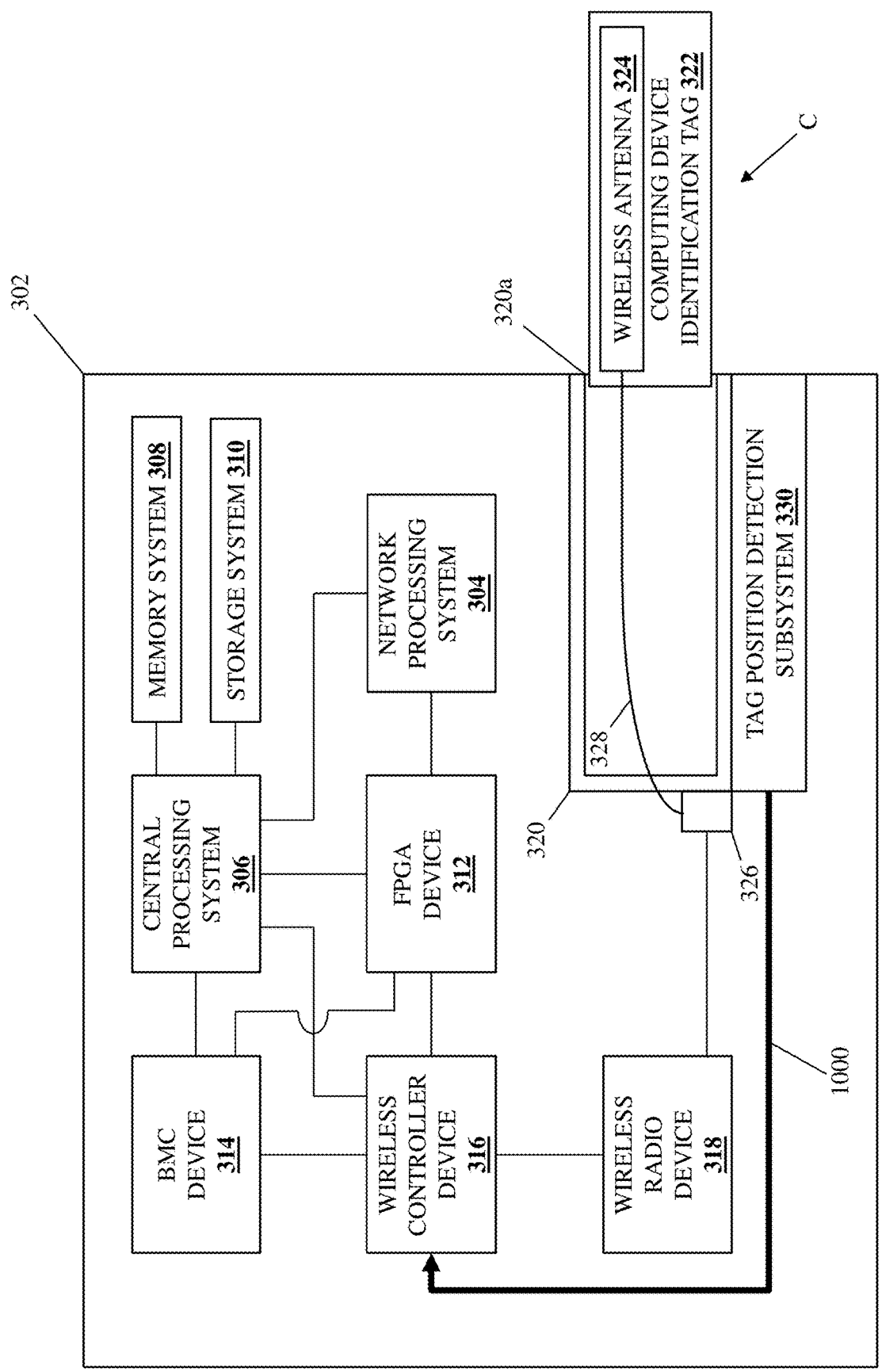
FIG. 10A is a schematic view illustrating an embodiment of the computing-device-identification-tag-based wireless communication enablement/disablement system on the computing device of FIG. 5 operating during the method of FIG. 7.

With reference to FIG. 10A, in other examples of block 710, the tag position detection subsystem 330 in the wireless communication enablement/disablement subsystem may perform tag position identification operations 1000 that include identifying to the wireless communication enablement/disablement subsystem (e.g., provided by the wireless controller device 316 in this embodiment) that the computing device identification tag is provided in the extended orientation C (e.g., via the electro-mechanical sensor techniques described above, via the optical sensor techniques described above, etc.), and in response the wireless communication enablement/disablement subsystem may enable wireless communication transmission by the wireless controller device 316 via the wireless antenna 324. Furthermore, as will be appreciated by one of skill in the art in possession of the present disclosure, in other examples the wireless communication enablement/disablement subsystem may enable wireless communication transmission by the wireless radio device 318 via the wireless antenna 324 at block 710 while remaining within the scope of the present disclosure as well.

As such, with the computing device identification tag 322/408 on the computing device 300/400 discussed above with reference to FIG. 9 provided in the extended orientation C while the computing device identification tags 322/408 on the other computing devices 300/400 are provided in the retracted orientation A, wireless communications with the computing device 300/400 having its computing device identification tag 322/408 in the extended orientation C is enabled while wireless communications with the other computing devices 300/400 is disabled, thus enhancing wireless communications with the desired computing device 300/400 that has its computing device identification tag 322/408 in the extended orientation C by preventing wireless communications with its adjacent computing devices 300/400. For example, FIG. 10B illustrates how a user may bring a management device 1002 adjacent the computing device 300/400 having its computing device identification tag 322/408 in the extended orientation C in order to perform wireless communications 1004 with that computing device 300/400 (e.g., via the wireless antenna 324 in that computing device identification tag 322/408 and its wireless radio device 318, wireless controller device 316, and other components in that computing device 300/400), and one of skill in the art in possession of the present disclosure will appreciate how the wireless communication enablement/disablement subsystems for the present disclosure will prevent its adjacent computing devices 300/400 from interfering with those wireless communications 1004.

The method 700 then proceeds to decision block 712 where the method 700 proceeds depending on whether wireless communication is required. As will be appreciated by one of skill in the art in possession of the present disclosure, a user of the computing devices 300/400 discussed above with reference to FIG. 10B may continue to require wireless communications with the computing device 300/400 having its computing device identification tag 322/408 in the extended orientation C in order to continue to retrieve the status of that computing device 300/400, continue to perform management operations with that computing device 300/400, and/or for any of a variety of other wireless communication reasons known in the art. If, at decision block 710, wireless communication is required, the method 700 returns to block 710. As such, the method 700 may loop such that the wireless communication enablement/disablement subsystem in the computing device 300/400 having its computing device identification tag 322/408 in the extended orientation C continues to enable wireless communications via the wireless antenna 324 on its computing device identification tag 322/408 as long as that computing device identification tag 322/408 is provided in the extended orientation C.

If, at decision block 712, wireless communication is not required, the method 700 returns to block 702. For example, once the user is finished wirelessly communicating with the computing device 300/400 having its computing device identification tag 322/408 in the extended orientation C, that user may move the computing device identification tag 322/408 on that computing device 300/400 back into the computing device identification tag housing 320/406 (e.g., by "pushing" that computing device identification tag 322/408 opposite the direction B illustrated in FIGS. 5, 6A, and 6B, and into the computing device identification tag housing 320 via the computing device identification tag entrance 320a/404) to provide that computing device identification tag 322/408 in the retracted orientation A illustrated and discussed in detail with reference to FIGS. 3, 4A, and 4B above, and the method 700 may then repeat. Furthermore, while not described in detail, one of skill in the art in possession of the present disclosure will appreciate how the computing device identification tag 322/408 on any of the computing devices 300/400 may be moved from its retracted orientation A to its extended orientation C in order to retrieve the computing device identification information visible on that computing device identification tag 322/408, with that computing device identification tag 322/408 then moved back into its retracted orientation A in order to prevent wireless communications via the antenna 324 on that computing device identification tag 322/408 once that computing device identification information has been retrieved.

Thus, systems and methods have been described that provide a wireless antenna for a wireless communication subsystem in a computing device identification tag that is moveable between a retracted orientation within a computing device chassis and an extended orientation outside of the computing device chassis, with wireless communication enabled via the wireless antenna when the computing device identification tag is in the extended orientation, and disabled when the computing device identification tag is in the retracted orientation. For example, the computing-device-identification-tag-based wireless communication enablement/disablement system of the present disclosure may include a computing device chassis, and a computing device identification tag that is moveably coupled to the computing device chassis such that the computing device identification tag is configured to be moved between a retracted orientation in which the computing device identification tag is housed in the computing device chassis, and an extended orientation in which the computing device identification tag extends from the computing device chassis. A wireless antenna is included on the computing device identification tag. A wireless communication enablement/disablement subsystem is included in the computing device chassis and is configured to disable wireless communications via the wireless antenna when the computing device identification tag is provided in the retracted orientation, and enable wireless communications via the wireless antenna when the computing device identification tag is provided in the extended orientation. As such, the systems and methods described herein address issues with conventional wireless communications with computing device in close proximity with each other.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing-device-identification-tag-based wireless communication enablement/disablement system, comprising:
    a computing device chassis;
    a computing device identification tag that is moveably coupled to the computing device chassis such that the computing device identification tag is configured to be moved between a retracted orientation in which the computing device identification tag is housed in the computing device chassis, and an extended orientation in which the computing device identification tag extends from the computing device chassis;
    a wireless antenna that is included on the computing device identification tag; and
    a wireless communication enablement/disablement subsystem that is included in the computing device chassis and that includes a computing device identification tag position detection subsystem including one of:
        a physical detection device that is configured to be engaged by the computing device identification tag when the computing device identification tag is provided in the retracted orientation; or
        an optical detection device that is configured to detect when a light emitted by the optical detection device indicates the computing device identification tag is provided in the retracted orientation,
    wherein the computing device identification tag position detection subsystem is configured to:
        detect that the computing device identification tag is provided in the retracted orientation and cause the wireless communication enablement/disablement subsystem to disable wireless communication transmission by a wireless communication subsystem via the wireless antenna; and
        detect that the computing device identification tag is provided in the extended orientation and cause the wireless communication enablement/disablement subsystem to enable wireless communication transmission by the wireless communication subsystem via the wireless antenna.

2. The system of claim 1, wherein the computing device identification tag includes computing device identification information for the computing device chassis that is visible on a surface of the computing device identification tag.

3. The system of claim 1,
    wherein the wireless communication subsystem is provided by a Near Field Communication (NFC) subsystem that is included in the computing device chassis.

4. The system of claim 1, wherein the wireless communication enablement/disablement subsystem includes a computing device identification tag housing that is included in the computing device chassis, that is configured to house the computing device identification tag when the computing device identification tag is provided in the retracted orientation, and that is configured to obstruct wireless communications via the wireless antenna when the computing device identification tag is provided in the retracted orientation.

5. The system of claim 4, wherein wireless communications via the wireless antenna are configured to produce Eddy currents in the computing device identification tag housing that obstruct the wireless communications via the wireless antenna when the computing device identification tag is provided in the retracted orientation.

6. The system of claim 1, wherein the computing device chassis is a networking device chassis provided for a networking device.

7. An Information Handling System (IHS), comprising:
    a chassis;
    a processing system that is included in the chassis;
    a wireless communication subsystem that is included in the chassis, that is coupled to the processing system, and that is configured to transmit wireless communications;
    an identification tag that is moveably coupled to the chassis such that the identification tag is configured to be moved between a retracted orientation in which the identification tag is housed in the chassis, and an extended orientation in which the identification tag extends from the chassis;
    a wireless antenna that is included on the identification tag and coupled to the wireless communication subsystem; and
    a wireless communication enablement/disablement subsystem that is included in the chassis and that includes an identification tag position detection subsystem that includes one of:
        a physical detection device that is configured to be engaged by the identification tag when the identification tag is provided in the retracted orientation; or
        an optical detection device that is configured to detect when a light emitted by the optical detection device indicates the identification tag is provided in the retracted orientation,
    wherein the identification tag position detection subsystem is configured to:
        detect that the identification tag is provided in the retracted orientation and cause the wireless communication enablement/disablement subsystem to disable wireless communication transmission by a wireless communication subsystem via the wireless antenna; and detect that the identification tag is provided in the extended orientation and cause the wireless communication enablement/disablement subsystem to enable wireless communication transmission by the wireless communication subsystem via the wireless antenna.

8. The IHS of claim 7, wherein the identification tag includes IHS identification information for the IHS that is visible on a surface of the identification tag.

9. The IHS of claim 7, wherein the wireless communication subsystem is provided by a Near Field Communication (NFC) subsystem.

10. The IHS of claim 7, wherein the wireless communication enablement/disablement subsystem includes an identification tag housing that is included in the chassis, that is configured to house the identification tag when the identification tag is provided in the retracted orientation, and that is configured to obstruct wireless communications via the wireless antenna when the dentification tag is provided in the retracted orientation.

11. The IHS of claim 10, wherein the wireless communications via wireless antenna are configured to produce Eddy currents in the identification tag housing that obstruct the wireless communications via the wireless antenna when the identification tag is provided in the retracted orientation.

12. The IHS of claim 7, wherein the IHS is a networking switch device.

13. The IHS of claim 7, wherein the IHS is a server device.

14. A method for enabling and disabling wireless communications by a computing device using a computing device identification tag, comprising:

moving, by a computing device identification tag that is coupled to a computing device chassis, from a retracted orientation in which the computing device identification tag is housed in the computing device chassis to an extended orientation in which the computing device identification tag extends from the computing device chassis;

detecting, by a computing device identification tag position detection subsystem in the computing device chassis, that the computing device identification tag has moved to the extended orientation, wherein the computing device identification tag position detection subsystem includes one of:
  a physical detection device that is configured to be engaged by the identification tag when the identification tag is provided in the retracted orientation; or
  an optical detection device that is configured to detect when a light emitted by the optical detection device indicates the identification tag is provided in the retracted orientation;

enabling, by a wireless communication enablement/disablement subsystem in the computing device chassis in response to the computing device identification tag being detected in the extended orientation, wireless communications via a wireless antenna that is included on the computing device identification tag;

moving, by the computing device identification tag, from the extended orientation in which the computing device identification tag extends from the computing device chassis to the retracted orientation in which the computing device identification tag is housed in the computing device chassis;

detecting, by the computing device identification tag position detection subsystem in the computing device, that the computing device identification tag has moved to the retracted orientation; and disabling, by the wireless communication enablement/disablement subsystem in response to the computing device identification tag being provided detected in the retracted orientation, wireless communications via the wireless antenna.

15. The method of claim 14, wherein the computing device identification tag includes computing device identification information for the computing device chassis that is visible on a surface of the computing device identification tag.

16. The method of claim 14, wherein the wireless communication subsystem is provided by a Near Field Communication (NFC) subsystem, and the method further comprises:

transmitting, by the NFC subsystem, wireless communications using the wireless antenna.

17. The method of claim 14, further comprising:

housing, by a computing device identification tag housing that is included in the wireless communication enablement/disablement subsystem, the computing device identification tag when the computing device identification tag is provided in the retracted orientation; and obstructing, by the computing device identification tag housing, wireless communications via the wireless antenna when the computing device identification tag is provided in the retracted orientation.

18. The method of claim 17, further comprising:

producing, in response to wireless communications via the wireless antenna, Eddy currents in the computing device identification tag housing that obstruct the wireless communications via the wireless antenna when the computing device identification tag is provided in the retracted orientation.

19. The method of claim 14, wherein the computing device chassis is a networking device chassis provided for a networking device.

20. The method of claim 14, wherein the computing device chassis is a server device chassis provided for a server device.

* * * * *